(12) United States Patent
Chen

(10) Patent No.: US 9,036,368 B2
(45) Date of Patent: May 19, 2015

(54) CABLE MANAGEMENT DEVICE IN CHASSIS

(76) Inventor: Ching-Sheng Chen, Su'ao Township, Yilan County (TW)

(*) Notice: Subject to any disclaimer, the term of this patent is extended or adjusted under 35 U.S.C. 154(b) by 84 days.

(21) Appl. No.: 13/546,503

(22) Filed: Jul. 11, 2012

(65) Prior Publication Data

US 2014/0014396 A1    Jan. 16, 2014

(51) Int. Cl.
    *H02G 3/04*      (2006.01)

(52) U.S. Cl.
    CPC .............. *H02G 3/045* (2013.01); *H02G 3/0418* (2013.01)

(58) Field of Classification Search
None
See application file for complete search history.

(56) References Cited

U.S. PATENT DOCUMENTS

| | | | | |
|---|---|---|---|---|
| 2,921,607 A * | 1/1960 | Caveney | ...................... | 138/106 |
| 3,156,765 A * | 11/1964 | Weiss | .............................. | 174/101 |
| 3,705,949 A * | 12/1972 | Weiss | ............................. | 174/101 |
| 3,890,459 A * | 6/1975 | Caveney | ....................... | 174/101 |
| 5,730,613 A * | 3/1998 | Yamada | ........................ | 439/293 |
| 6,437,243 B1 * | 8/2002 | VanderVelde et al. | ....... | 174/68.3 |
| 6,489,565 B1 * | 12/2002 | Krietzman et al. | ........... | 174/101 |
| 6,589,068 B2 * | 7/2003 | Yu | .................................. | 439/495 |
| 7,778,513 B2 * | 8/2010 | Rinderer et al. | ............... | 385/134 |
| 2006/0162948 A1 * | 7/2006 | Rinderer et al. | ................ | 174/50 |
| 2011/0174534 A1 | 7/2011 | Krietzman et al. | | |
| 2011/0286198 A1 | 11/2011 | Kelly et al. | | |

FOREIGN PATENT DOCUMENTS

WO      2011100613 A1     8/2011

* cited by examiner

*Primary Examiner* — Timothy Thompson
*Assistant Examiner* — Krystal Robinson
(74) *Attorney, Agent, or Firm* — Shui-Chou Chou; Chou IP & BioInformatics

(57) ABSTRACT

A cable management device used in a chassis includes a frame and two board-like cable management units are respectively connected to two sides of the frame. Each cable management unit has multiple recesses. The cables of each of the ports are located in the corresponding recesses to avoid the cables from being in contact with each other and have better heat dissipating feature.

5 Claims, 10 Drawing Sheets

CABLE MANAGEMENT DEVICE IN CHASSIS

BACKGROUND OF THE INVENTION (1) Field of the Invention

The present invention relates to a cable management device, and more particularly, to a cable management device used in a chassis so as to manage the cables of different types, positions and numbers.

(2) Description of the Prior Art

Along with the progress of the transmission of information, the chassis is used widely for installation of different information technology (IT) devices. The conventional chassis does not have proper management so that the cables, wires are randomly installed to the chassis so that when one of the parts or cables needs to be replaced, the cables of other parts impede the replacement so that the users have to spend a lot of time to remove and re-install said other parts and the cables thereof. This improper management of the cables consumes too much time and needs to be improved.

The advanced technology requires more space in the chassis so as to meet the requirements of many cables and IT devices, and how to properly manage the cables becomes an important issue in this business. The conventional way to randomly connect the cables cannot have better heat dissipating feature and more electric energy wastes.

As shown in FIG. 1, the conventional cable management unit 90 includes an inverted U-shaped body 91 and an end board 92. The body 91 has multiple outlets 93 defined through two sides of the body 91. The cables are properly separated from each other by the outlets 93. The cable management unit 90 has a specific format wherein the different ports 94 have specific distances separated from each other. Different IT devices have different number and positions of ports so that when multiple IT devices are involved, the conventional cable management unit 90 cannot well manage the cables so that the heat cannot be removed and the IT devices can be damaged. In order to keep the proper temperature for these IT devices, more electric energy is needed.

The present invention intends to provide a cable management device used in a chassis so as to improve the shortcomings of the conventional chasses.

SUMMARY OF THE INVENTION

The present invention relates to a cable management device and comprises a frame connected to a chassis and two board-like cable management units are connected to two sides of the frame. Each cable management unit has multiple recesses and each recess communicates with an opening which is located away from the frame.

Preferably, the frame has two rails and the two cable management units are respectively and slidably engaged with the two rails.

Preferably, each of the cable management units has a connection portion which is slidably engaged with the rail so that the cable management unit is slidable along the rail.

Preferably, the connection portion includes two resilient tabs extending therefrom.

Preferably, each of the cable management units has multiple management boards and each management board has one recess and one opening.

Preferably, each of the management boards has a clip clipped thereon and the clip seals the opening.

Preferably, each of the clips has a clip portion and each of the management boards has an engaging portion to which the clip portion clips.

Preferably, each of the two cable management units is an L-shaped board which has a baseboard and a side board. The base board is connected to the frame.

Preferably, each of the two cable management units has a clip which is connected to the side board and seals the openings.

Preferably, each of the clips has a clip portion and each of the side boards has an engaging portion to which the clip portion clips.

Preferably, a cover is connected to the side boards and seals the openings.

Preferably, the cover has two hooked portions and each of the side boards has a protrusion which is engaged with the hook portion corresponding thereto.

The primary object of the present invention is to provide a cable management device which has multiple cable management units connected to a standard frame. The cables of each of the ports are located in the corresponding recesses (Per PORT Designed) to avoid the cables from being in contact with each other and have better heat dissipating feature.

Another object of the present invention is to provide a cable management device wherein the L-shaped management boards with recesses are provided to meet different requirements. The manufacturing cost can be reduced.

Yet another object of the present invention is to provide a cable management device wherein the clip seals the opening and the frame has a hollow portion to avoid the cable from being in contact with each other and to obtain better heat dissipating feature.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENTS

Figure 1:
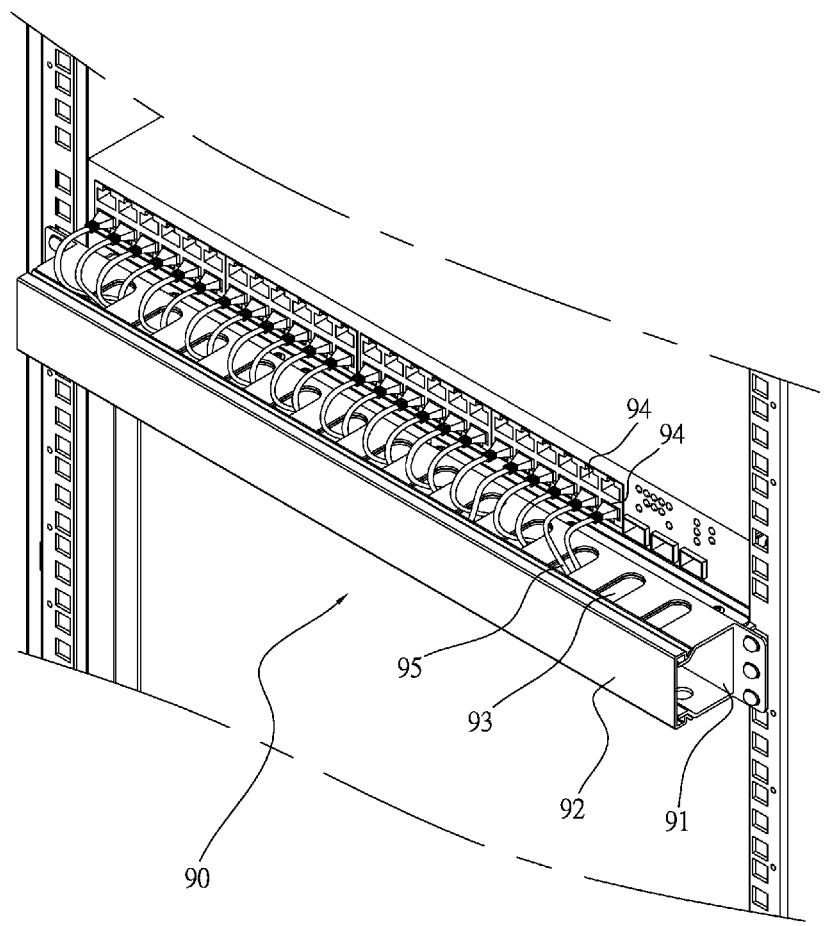
FIG. 1 shows the conventional cable management unit.

Referring to FIGS. 2 to 6, the cable management device of the present invention comprises a frame 10 which meets the requirements of EIA-310D, and the frame 10 is connected to a chassis and equipped with proper number of recesses and one cable is engaged with one of the recesses.

The cable management device of the present invention comprises a frame 10 and two board-like cable management units 20. The frame 10 has multiple locking holes 12 defined in two sides thereof so that the frame 10 is connected to the chassis by the locking holes 12. The two respective sides of the two cable management units 20 are respectively connected to two sides of the frame 10. Each cable management unit 20 has multiple recesses 22 and each recess 22 communicates with an opening 23 which is located away from the frame 10. By multiple cable management units 20 connected to the frame 10, the cables are engaged with the recesses 22 corresponding thereto so that the cables are not in contact with each other and well managed. The well managed cables also provide better heat dissipating feature.

Figure 2:
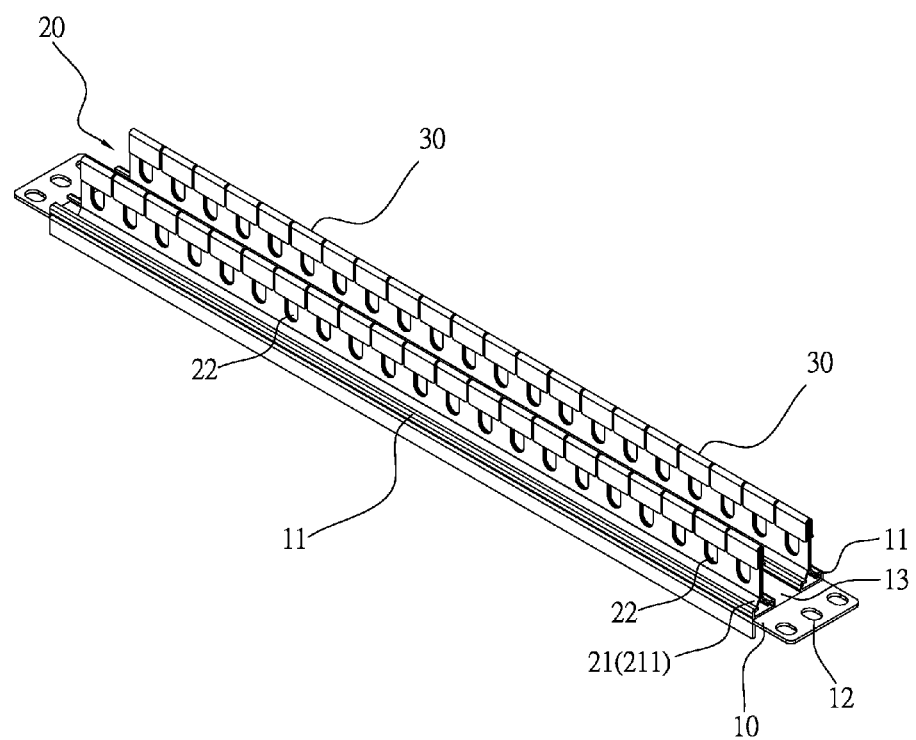
FIG. 2 is a perspective view to show the frame with rails and the cable management units of the present invention.
Figure 3:
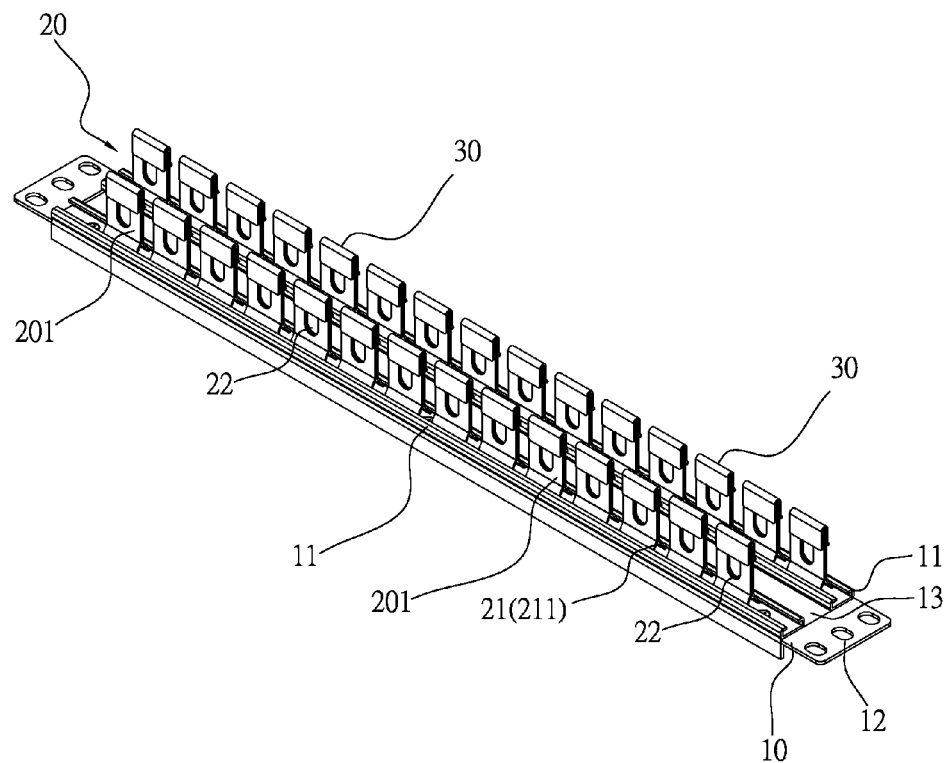
FIG. 3 is a perspective view to show multiple management boards on the rails, wherein each management board has one recess.
Figure 4:
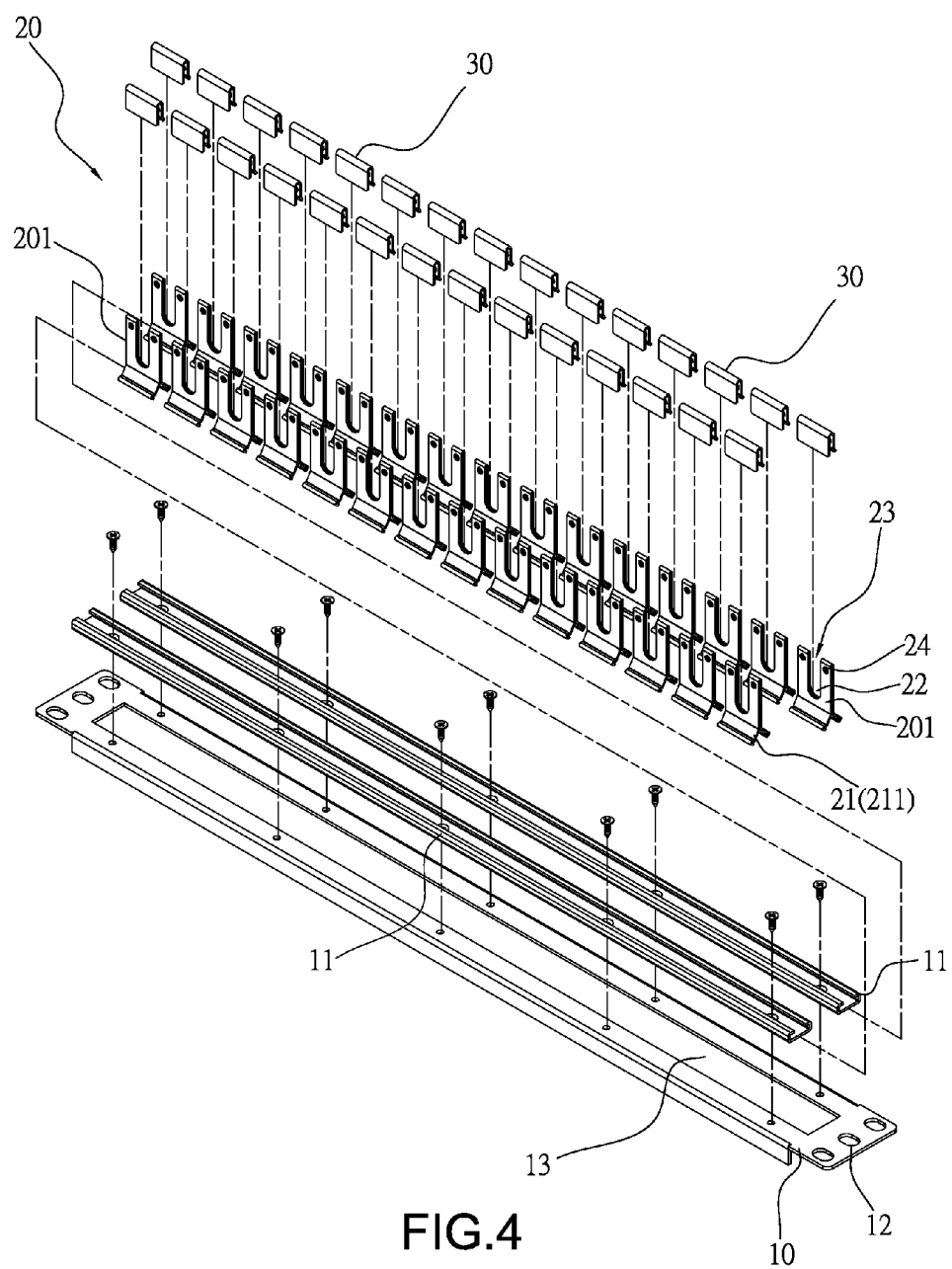
FIG. 4 is an exploded view to show the frame and multiple management boards on the rails as disclosed in FIG. 3.

The frame 10 has two rails 11 and each of the cable management units 20 has a connection portion 21 which is slidably engaged with the rail so that the cable management unit 20 is slidable along the rail 11. In order to easily manage the cables according to the different ports, each of the cable management units 20 has multiple management boards 201 and each management board 201 has one recess 22 and one opening 23 as shown in FIGS. 2 and 3. By this arrangement, the specific management boards 201 are chosen according to the types and positions of the ports and these management boards 201 are engaged with the rails 11 to obtain the optimal cable management. Each of the management boards 201 has a clip 30 clipped thereon and the clip 30 seals the opening 23. Each of the clips 30 has a clip portion 31 and each of the management boards 201 has an engaging portion 24 located beside the opening 23 so that the clip portion 31 clips the engaging portion 24. By the engagement between the clip portion 31 and the engaging portion 24, the clips 30 are connected to the management boards 201 and seal the openings 23 so that the cables extend through the recesses 22. Furthermore, the frame 10 has at least one hollow portion 13 to have better ventilation and increase the efficiency of heat dissipation.

Figure 5:
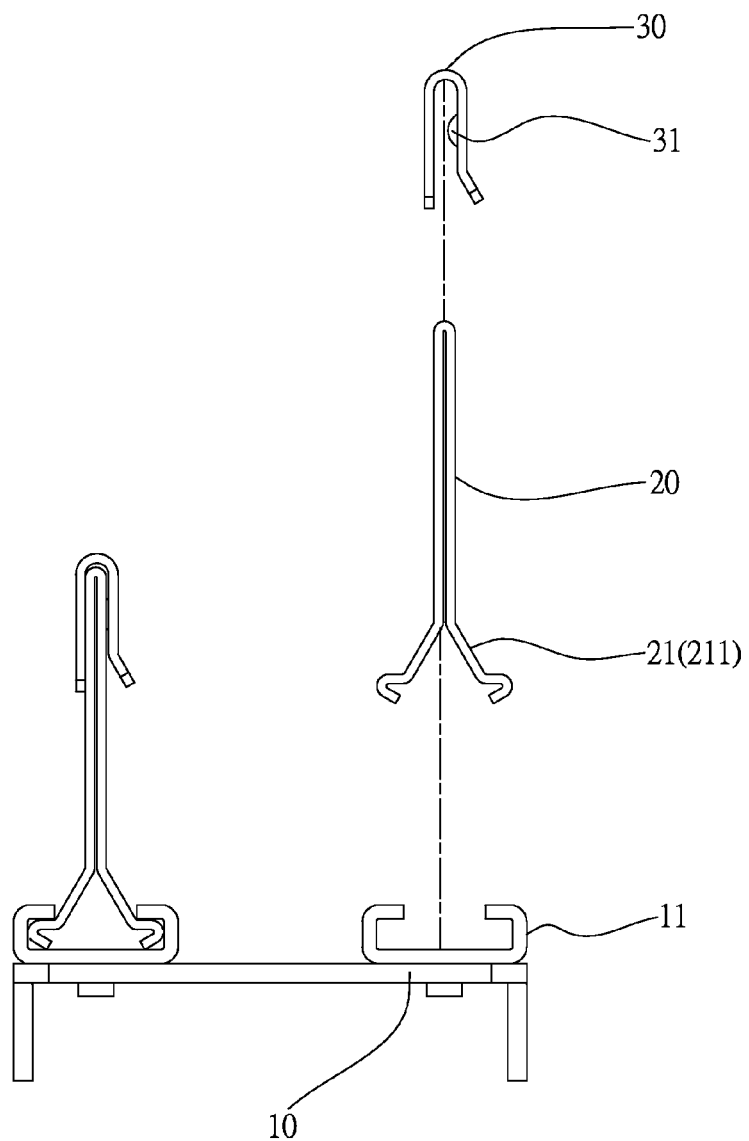
FIG. 5 is an end view to show the frame and multiple management boards on the rails.
Figure 6:
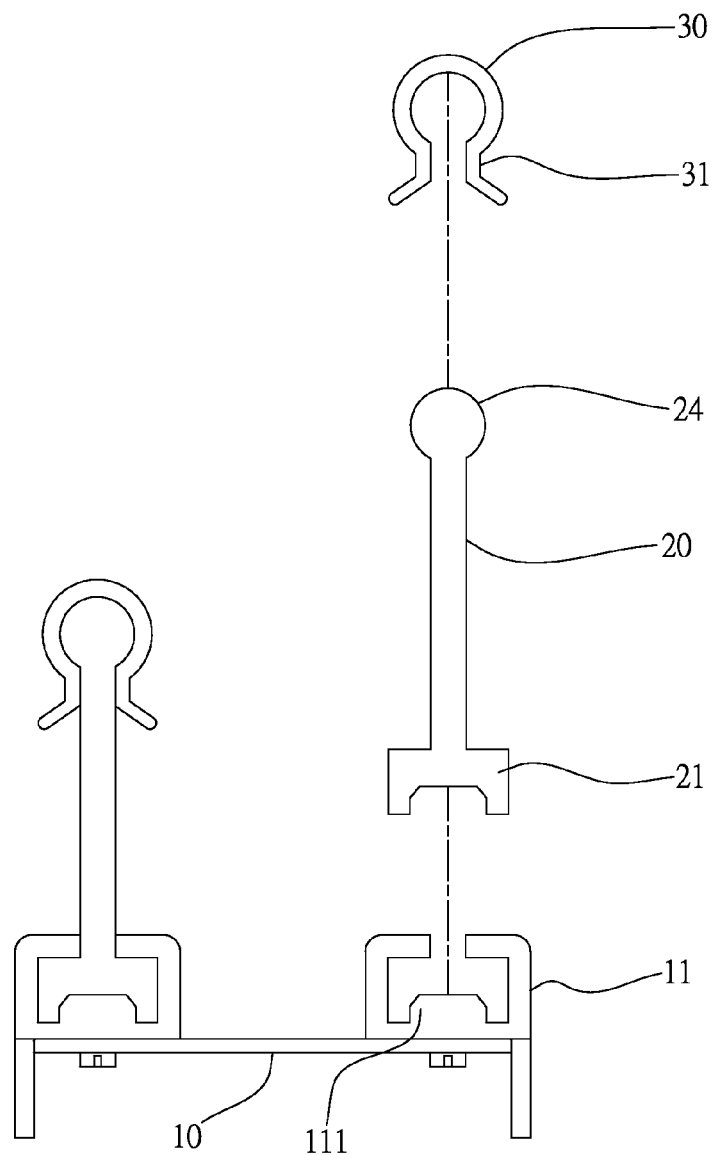
FIG. 6 shows another embodiment of the frame and multiple management boards on the rails.

As shown in FIGS. 5 and 6, two embodiments of the cable management units 20 are disclosed, wherein each of the cable management units 20 has the connection portion 21 which is slidably engaged with the rail 11 so that the cable management unit 20 is slidable along the rail 11. FIG. 5 shows the thin-plate type clip 30 connected to the cable management unit 20 so as to seal the opening 23. The connection portion 21 includes two resilient tabs 211 extending therefrom so that the connection portion 21 is easily engaged with the rail 11 by the resilient tabs 211. In FIG. 6, the curved clip 30 is connected to the cable management unit 20 and the engaging portion 24 is formed on the top of the cable management unit 20, so that the connection portion 21 is easily connected to the cable management unit 20 and seals the opening 23. Each rail 11 has a rib 111 extending therefrom to firmly set the cable management unit 20.

When the ports are the same type, the L-shaped boards 202 with the identical recesses 22 are used to save the assembly time and the cost of the material.

Figure 7:
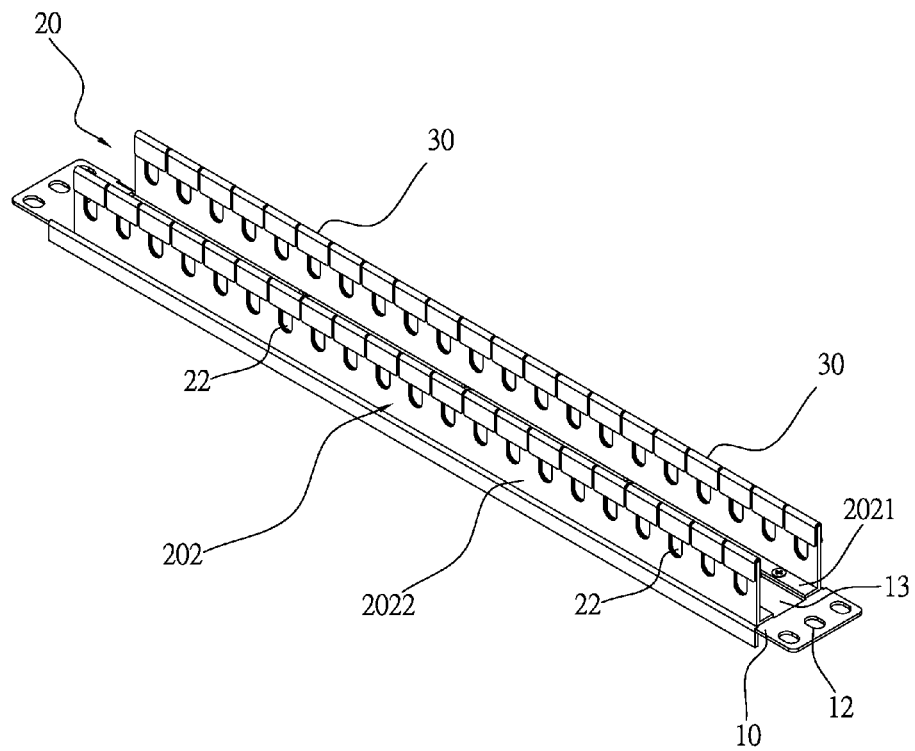
FIG. 7 shows another embodiment of the L-shaped board of the present invention.
Figure 8:
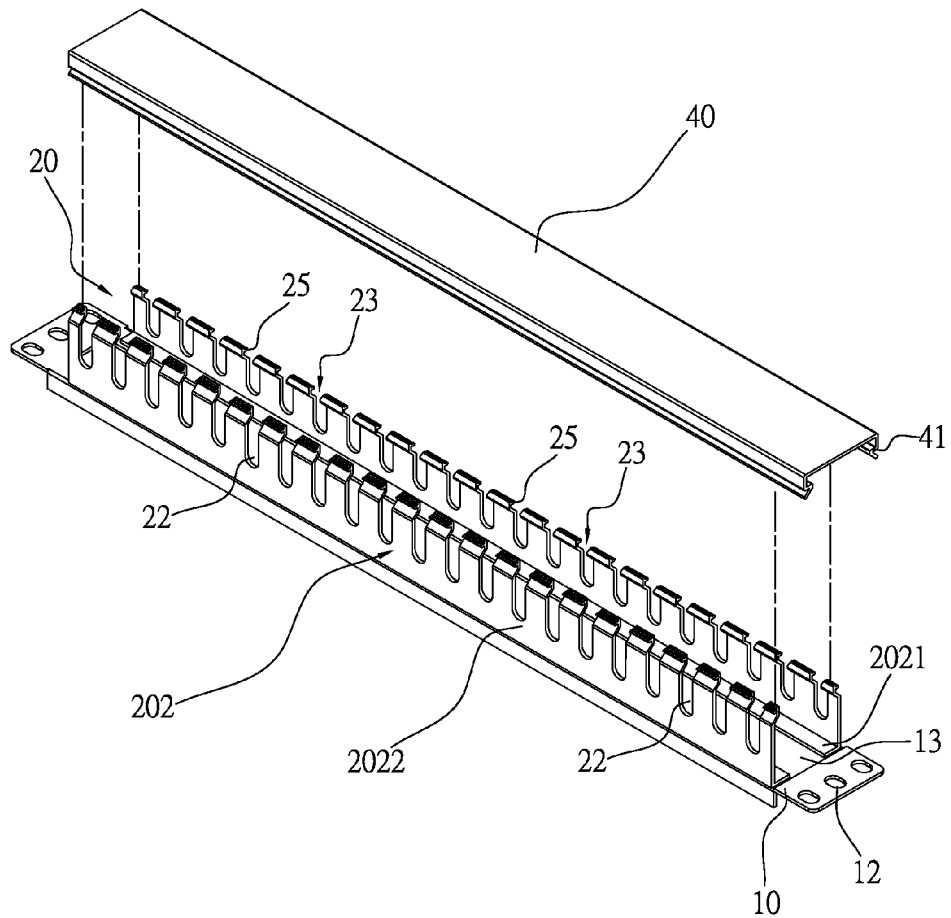
FIG. 8 shows the cover and the cable management unit of the present invention.
Figure 9:
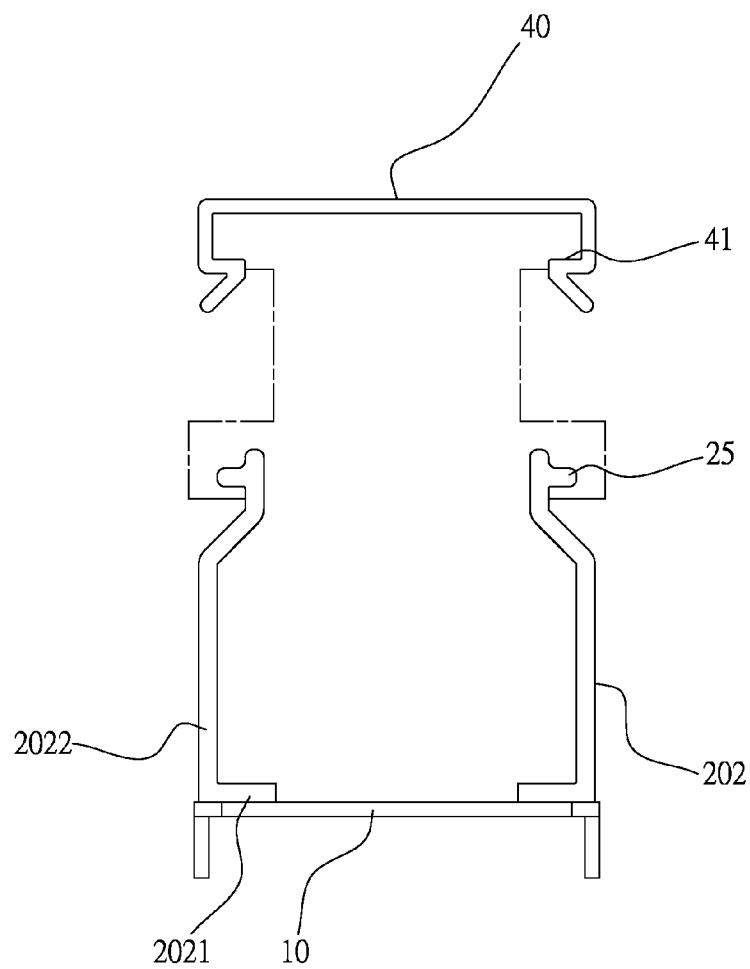
FIG. 9 is an end view to show the combination of the cover and the cable management unit of the present invention.

Referring to FIGS. 7 to 9, yet another embodiment of the cable management device is disclosed and comprises a frame 10 and two cable management units 20. The frame 10 has multiple locking holes 12 defined in two sides thereof so that the frame 10 is connected to the chassis by the locking holes 12. The two respective sides of the two cable management units 20 are respectively connected to two sides of the frame 10. Each cable management unit 20 has multiple recesses 22 and each recess 22 communicates with an opening 23. In this embodiment, the cable management units 20 are L-shaped boards 202 and each of the L-shaped boards 202 has a base board 2021 and a side board 2022. The recesses 22 and the openings 23 are located at the side board 2022 for receiving the cables. As shown in FIG. 7, each of the two cable management units 20 has a clip 30 on the top thereof. Further referring to FIGS. 5 and 6, each of the clips 30 has a clip portion 31 and each of the side boards 2022 has an engaging portion 24 located beside the opening 23 so that the clip portion 31 clips the engaging portion 24. By the engagement between the clip portion 31 and the engaging portion 24, the cable management units 20 are connected to the side boards 2022 and seal the openings 23. As shown in FIGS. 8 and 9, a cover 40 has two hooked portions 41 and each of the side boards 2022 has a protrusion 25 which is located beside the opening 23 of each of the side boards 2022 so that the hooked portions 41 are engaged with the protrusion 25. The cover 40 seals the openings 23. The frame 10 has at least one hollow portion 13 to have better ventilation and increase the efficiency of heat dissipation.

Figure 10:
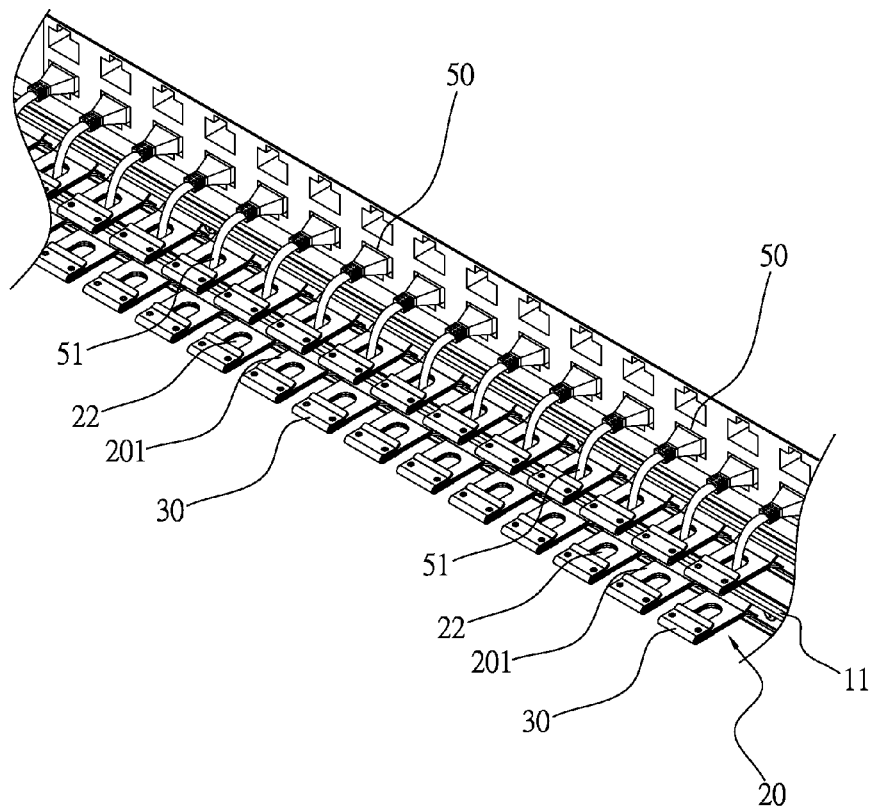
FIG. 10 shows the cable management device of the present invention used in a chassis.

As shown in FIG. 10, when in use, the management boards 201 are chosen by the types of ports 50, the sizes of the cables 51 and the number of the cables 51. The management boards 201 are engaged with the rails 11 one by one and the cables 51 then extend through the recesses 22. The cable management device of the present invention used in a chassis can meet requirements of the cables 51 and the ports 50, and each cable 51 extend through the individual recess 22, so that the cables 51 are not in contact with each other. The applicant names the arrangement as the Per PORT Designed.

While we have shown and described the embodiment in accordance with the present invention, it should be clear to those skilled in the art that further embodiments may be made without departing from the scope of the present invention.

What is claimed is:

1. A cable management device for managing a cable that communicates a port of an information technology device which is mounted in a chassis, comprising:
    a frame paralleling said port and connected to said chassis on one side of said frame;
    at least one rail connected to the opposite side of said frame, said rail including two side arms extending upward from two opposite ends of said rail and turning inward to form two inturned parts, a gap defined by said two inturned parts, and a channel delimited by side gap and said two arms, said channel communicating substantially its entire length with said rail;
    a plurality of management boards having width substantially equal to gap, said management board characterized by a upper end and a lower end, said upper end including a recess defined by said cable for accommodating said cable, said lower end having an expanded portion that extends laterally therefrom so that the width is essentially equal to the width of said channel, whereby said management board mates said rail with said expanded portion, whereby said management board is slidably engaged with said channel of said rail, and whereby said management board is seated at a predetermined positon above said rail;
    a plurality of clips disposed on said upper end for closing the upper opening of said recess; whereby said cable is retained by said recess.

2. The device of claim 1, wherein said expanded portion of said lower end of said management board is two resilient tabs being biased in an opening position toward the inner walls of two said side arms, whereby seating or unseating of said management board above said rail is controlled by operating the resiliency of said resilient tabs.

3. The device of claim 1, wherein each of said plurality of clips has two resilient legs being integral at the lower end, said two resilient legs being biased in a closed direction, whereby said clip closes the upper opening of said recess.

4. The device of claim 1, wherein said at least one rail is two rails that are parallel to two sides of said frame, and said frame has at least one hollow portion between said two rails.

5. The device of claim 1, wherein said plurality of management boards combines and integrates each other longitudinally, whereby a large board of a predetermined length is formed.

\* \* \* \* \*